June 2, 1931.  J. I. TAYLOR  1,808,582
METHOD OF MAKING WINDOW GUIDE CHANNELS
Filed Feb. 29, 1928   2 Sheets-Sheet 1
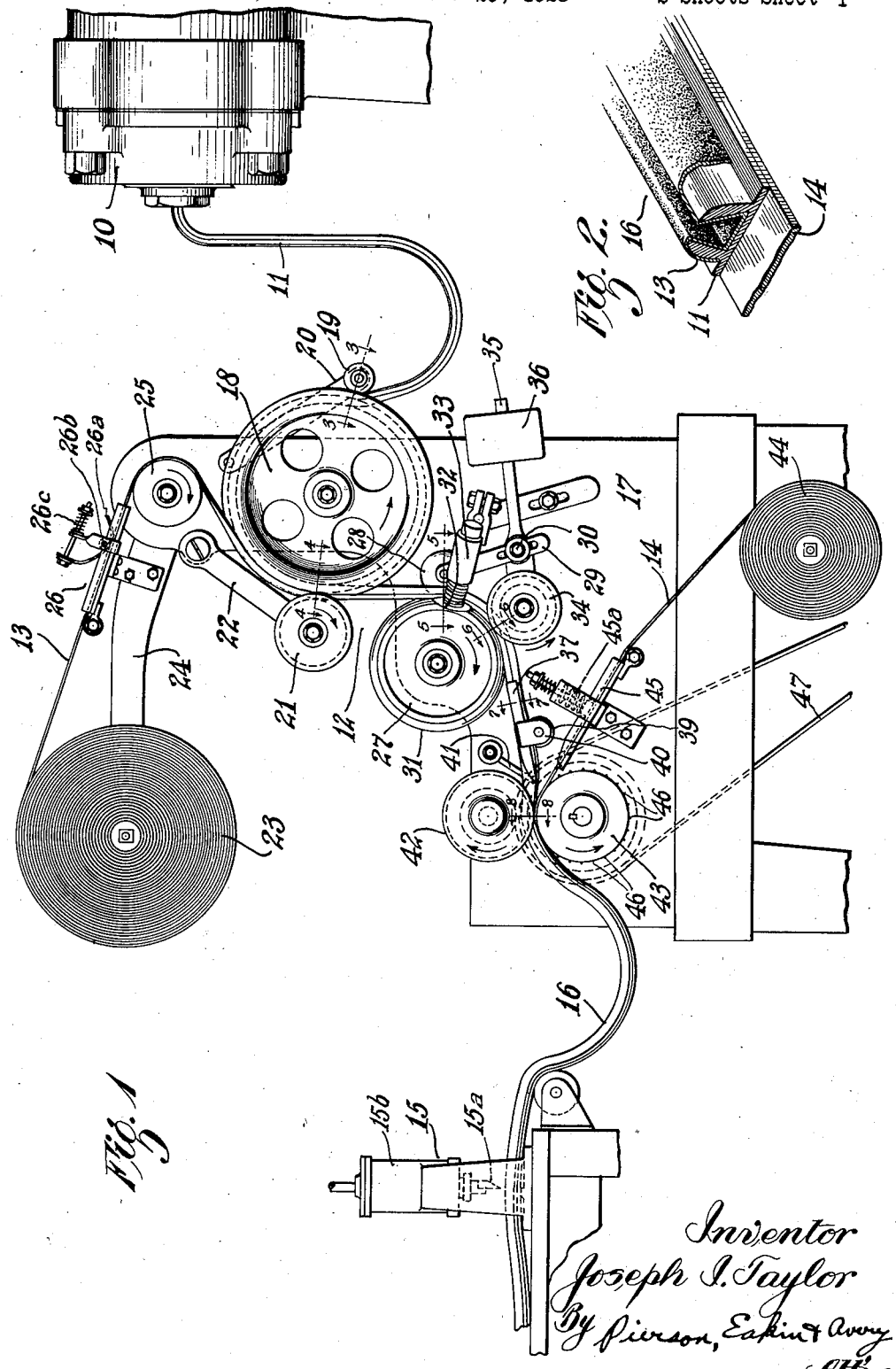

June 2, 1931.     J. I. TAYLOR     1,808,582
METHOD OF MAKING WINDOW GUIDE CHANNELS
Filed Feb. 29, 1928     2 Sheets-Sheet 2
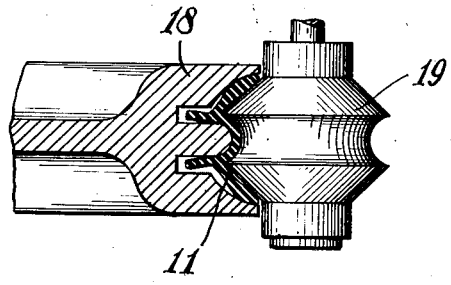
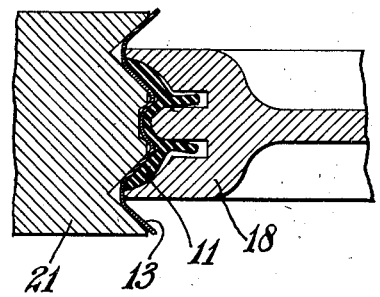
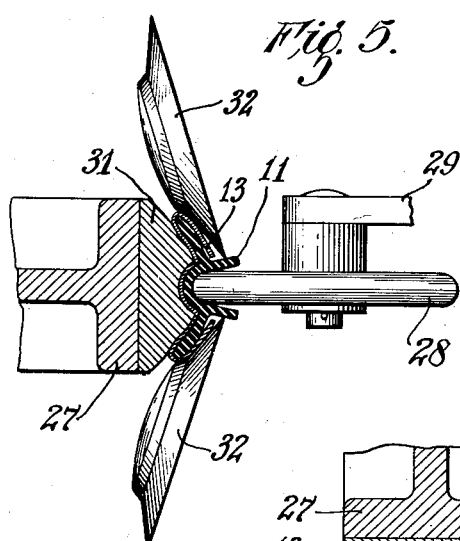
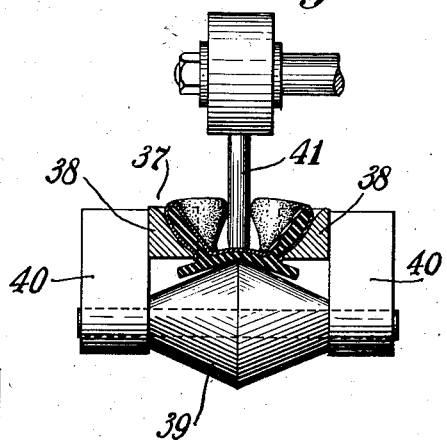
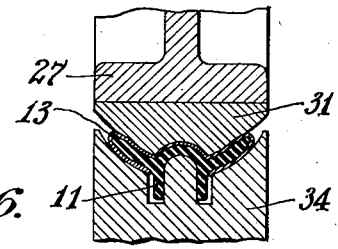
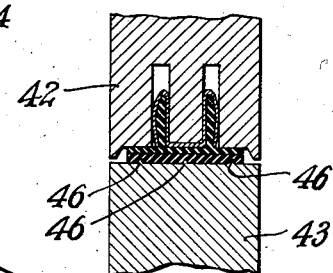
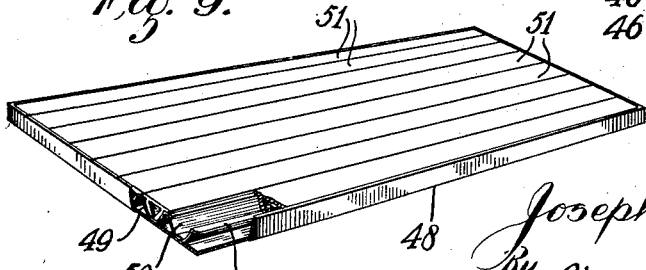
Inventor
Joseph I. Taylor
By Pierson, Eakin & Avery
Attys.

Patented June 2, 1931

1,808,582

UNITED STATES PATENT OFFICE

JOSEPH I. TAYLOR, OF AKRON, OHIO, ASSIGNOR TO THE B. F. GOODRICH COMPANY, OF NEW YORK, N. Y., A CORPORATION OF NEW YORK

METHOD OF MAKING WINDOW GUIDE CHANNELS

Application filed February 29, 1928. Serial No. 257,941.

This invention relates to methods of making window-guide channels such as commonly are used with the vertically-sliding, sashless window panes in automobile bodies, and especially channels composed of a generally U-shaped rubber structure provided with a cover of felt or other smooth fabric adhered thereto.

In the manufacture of such window-guide channels heretofore, the rubber body has been formed in substantially its final shape by means of an extruding machine and the machine for covering the rubber channel with felt has been positioned at a distance from the extruding machine. Between the extruding machine and the covering machine was a cooling tank of cold water through which the extruded channel was passed, to reduce its plasticity so that it could be flexed and otherwise manipulated in the covering machine without permanent distortion.

The arrangement was such that the extruding machine and the covering machine required individual operators. Also, to the extent that water or moisture from the cooling bath remained on the rubber channel and was entrapped by the cover material applied thereto, defective articles resulted from the formation of steam under the cover during the vulcanizing operation.

One of the chief objects of this invention is to provide an improved method of making window-guide channels whereby one operator can operate both the channel-extruding machine and the channel covering machine. Another object is to avoid the production of defective articles as a result of moisture remaining on the rubber structure. A further object is to provide for improved adhesion between the rubber body and the cover.

Of the accompanying drawings:

Fig. 1 is a side elevation of apparatus adapted to carry out my invention in its preferred form, and the work therein.

Fig. 2 is a sectional perspective view of a finished article produced by my improved method, parts being broken away.

Fig. 3 is a section on line 3—3 of Fig. 1.
Fig. 4 is a section on line 4—4 of Fig. 1.
Fig. 5 is a section on line 5—5 of Fig. 1.
Fig. 6 is a section on line 6—6 of Fig. 1.
Fig. 7 is a section on line 7—7 of Fig. 1.
Fig. 8 is a section on line 8—8 of Fig. 1.

Fig. 9 is a perspective view of a vulcanizing tray and the work therein as it is produced by the apparatus shown in Fig. 1, parts of the work and the tray being sectioned and broken away.

In the preferred practice of my invention the procedure comprises extruding a continuous length of channel-rubber composition, immediately thereafter progressively applying an adhesive covering strip to certain longitudinal zones thereof, progressively applying a previously formed adhesive strip of relatively stiff reinforcing material such as a fibrous rubber composition to another zone thereof, and thereafter vulcanizing the composite structure. In order that the soft, plastic channel will not be permanently distorted or disfigured during the operation of applying the covering material thereto, which operation is best accomplished with the leg-portions of the channel in spread apart or opened position, the die of the extruding machine is so formed that the channel is initially formed with its legs in a spread condition and the covering material is applied to the channel while it remains in such shape. After the cover is applied I bring the leg-portions approximately to parallel, upstanding position, so that the base-portion of the channel is substantially flat, and then apply the reinforcement strip to the outer face of the base.

The composite strip preferably is cut to serviceable lengths before vulcanization, and during the vulcanization thereof the strips are suitably supported so that the channel-legs are inclined toward each other so that in the finished article they are adapted firmly to engage the marginal portions of a window pane.

Referring to the drawings, 10 (Fig. 1) is an extruding machine for forming a continuous length of rubber channel 11, and closely adjacent the extruding machine is a covering device 12 adapted to apply to the channel while it is still warm an adhesive cover-strip 13 and an adhesive fibrous reinforcement strip 14. A cut-off device 15 is positioned at the delivery end of the covering device 12 for severing the covered channel, designated 16, into serviceable lengths before vulcanization. The channel-strip 11 as it comes from the extruding machine 10 has a widely open cross-sectional form as compared with the shape of the finished channel, its leg-portions being divergent and its normally-flat base-portion having an arcuate contour, substantially as shown in Figs. 3, 4, 5, and 6 of the drawings.

The covering device 12 is adapted to receive the channel-strip 11 from the extruding machine 10, and, without further distorting it, to apply an adhesive cover of felt or other fabric to the leg-portions thereof, then to flex the partly covered channel so that its base-portion is substantially flat and concurrently apply an adhesive reinforcement strip to said base-portion. The covering device comprises a series of cooperating rollers adapted to support and manipulate the work, and driven presser-rollers for compacting the assembled structure and drawing it through the device.

In the upper part of an upright frame 17 is journaled a roller 18 having its periphery suitably grooved as shown in Figs. 3 and 4 to provide a seat for the channel-strip 11, a presser-roller 19 journaled in the free end of an arm 20 which is pivotally secured to the frame 17 being provided for pressing said channel-strip into the groove of the roller 18 as it is first engaged by the latter after leaving the extruding machine 10.

Diametrically opposite the roller 19 is a peripherally grooved roller 21, Figs. 1 and 4, adapted to initiate the application of the cover-strip 13 to the channel-strip 11, by pressing the adhesive-treated face of the cover-strip against the exposed portion of the channel-strip which comprises the inner faces of the leg-portions and the intermediate base-portion. The roller 21 is journaled on the free end of an arm 22 which is pivotally secured to the frame 17, so that said roller rests of its own weight upon the work.

The cover-strip 13 is drawn from a supply-roll 23 which is mounted upon an outstanding arm 24 secured to the frame 17, said strip passing around a guide-roller 25 journaled on the frame 17 adjacent the roller 18. Mounted upon the arm 24 is an adjustable-tension device 26 adapted to apply suitable tension to the cover-strip 13 as it is drawn onto the channel-strip 11, said tension device comprising a flexible arcuate metal strip 26ᵃ pivoted near its middle upon a supporting rod 26ᵇ, and having one end positioned to engage the strip 13 and the other end connected with a compression spring 26ᶜ in such a manner as yieldingly to urge the first mentioned end against said strip.

Below and to one side of the roller 18 is journaled a peripherally grooved roller 27 adapted to receive and guide the partly-covered channel 11, as it comes from the roller 18, by engagement with the covered surface of the channel. Associated with the roller 27 is a disc-like presser-roller 28 adapted to hold the channel 11 in engagement with the roller 27 by pressure against the outer face of the arcuate base-portion of the channel, the roller 28 being journaled in the end of an arm 29 which is adjustably mounted upon a stud-bolt 30 fixed upon the frame. The peripheral surface of the roller 27 is composed of molded rubber 31 to provide a slightly yielding surface for engagement with the work to compensate for any irregularities in the surface of the latter.

Positioned at each side of the presser-roll 28 are frusto-conical discs 32, 32 (Figs. 1 and 5) which operate with a wiping action upon the cover material on the outer faces of the leg-portions of the channel-strip 11, laying the marginal portions of said cover-material substantially in their final position thereon. The discs 32 are journaled in respective brackets such as the bracket 33 (Fig. 1) adjustably mounted upon the frame and are spring-backed so as to engage the work with yielding pressure.

Adjacent the discs 32 at a more advanced position in the orbit of the roller 27 is a presser-roll 34 (Figs. 1 and 6) cooperating with the roller 27 to compress and compact the cover material 13 upon the channel-strip 11, the periphery of the roller 34 being grooved to accommodate the outwardly extending portions of said channel-strip. The presser-roller 34 is journaled on one end of a lever 35 which is fulcrumed near its middle upon the stud-bolt 30 and has its other end provided with an adjustable weight 36 for yieldingly urging the roller 34 against the work.

Mounted upon the frame 17 adjacent the roller 27 and in position to receive the work delivered therefrom is an elongate guide and shaping structure 37, (Figs. 1 and 7), comprising side plates 38, 38 which are suitably shaped to force the spread-apart leg-portions of the covered channel toward each other, and a roller 39 which is loosely journaled in depending ears 40, 40 secured to said side plates, said roller being tapered each way from its middle and adapted to engage the under side of the base-portion of said channel and force it to generally flat transverse shape. An angularly-adjustable separator rod 41 is mounted upon the frame 17 and extends downward between the leg-portions of the strip 11 at the delivery end of the shaping structure 37 to assist the guide-plates 38 in maintaining the leg-portions of the channel in upright position.

Adjacent the delivery end of the shaping structure 37 are respective upper and lower feed-rollers 42, 43 adapted to draw the channel-strip 11 through the covering apparatus for the application of the cover-strip 13 thereto and to draw the reinforcement strip 14 from its supply roll 44 into adhesive engagement with the bottom of the base-portion of the channel-strip and press it firmly thereagainst. A strip-guide 45 is mounted upon the frame 17 between the roller 43 and the supply-roll 44, and is provided with adjustable tension mechanism 45$^a$ for imparting tension to the reinforcement strip 14, said tension mechanism comprising a presser-foot actuated by opposed compression springs.

As shown in Fig. 8, the roller 43 has a flat peripheral surface which is provided with a multiplicity of upstanding pins 46, 46, adapted to prevent slippage between said roller and the reinforcement strip 14 which it engages. The periphery of the roller 42 is formed with deep grooves to accommodate the upstanding leg-portions of the channel-strip 11, those portions of the roller between and at each side of said grooves bearing against the base-portion of said strip to force it against the reinforcement strip 14. The rollers 42, 43 are geared together so as to rotate at the same surface speed, the roller 43 being driven, through the drive-belt 47, from a suitable source of power. The covered and reinforced channel-strip, designated 16, retains substantially the shape shown in Fig. 8 because of the transverse rigidity of the reinforcement strip 14.

The cutting-off device 15 for severing the continuous channel 16 preferably is power operated and as shown comprises a guillotine-knife 15$^a$ on the piston rod of a fluid-pressure cylinder 15$^b$. Suitable gauges (not shown) are provided for determining the length of the severed pieces.

As shown in Fig. 2, the finished guide-channel has its leg-portions inclined toward each other so as more firmly to grip a window pane mounted therebetween. This inclination of the leg-portions is imparted to the channels by the receptacle in which they are vulcanized, such a receptacle being shown in Fig. 9, in which 48 is a shallow flat pan and 49 is a false bottom therein, said false bottom being formed with a plurality of parallel grooves, such as the groove 50, having internally concave sides which converge toward the bottom of the respective grooves. The severed, service-lengths of covered and reinforced window-guide channels, designated 51, 51 are shown in vulcanizing position in the pan 48, and vulcanization thereof is effected in open heat in any suitable manner, the channels being only locally constrained by contact with the pan.

It will be seen that I have provided a simple, efficient, and continuous method of building window-guide channels, and that the objects set forth in the statement of objects are attained. Experience has shown that adhesion between the covering and reinforcing material and the rubber channel is improved by assembling them while the channel is in a warm condition, and that any subsequent shrinkage of the rubber structure will be compensated by the retraction of the covering and reinforcing strips, which are applied under tension, with the result that a superior article is produced.

My invention is subject to modification and I do not limit my claims to the exact procedure described.

I claim:

1. The method of making channeled strip material which comprises forming a channel-strip of unvulcanized rubber of widely open but complex cross-sectional shape, applying cover-material to said strip by progression lengthwise of the strip while it is in such shape, and thereafter shaping the covered strip to its ultimate form by progression lengthwise of the strip.

2. The method of making channeled strip material which comprises forming a channel-strip of unvulcanized rubber of widely open cross-sectional shape, applying adhesive cover-material to said strip while it is in such shape, partly shaping the strip to a more deeply channeled form and applying adhesive reinforcement material thereto, and thereafter completing the shaping of the strip to its ultimate form.

3. The method as defined in claim 2 in which the cover-material and reinforcement material are applied while under tension.

4. The method of making channeled strip material which comprises forming a continuous channel-strip of unvulcanized rubber in a widely open cross-sectional shape, progressively applying adhesive cover-material under tension to said channel, partly reshaping the strip and applying adhesive reinforcement material under tension thereto, severing the assembled strip into service lengths, and thereafter vulcanizing the strips while restraining them in their final shape.

In witness whereof I have hereunto set my hand this 27th day of February, 1928.

JOSEPH I. TAYLOR.